(12) United States Patent
Flosbach et al.

(10) Patent No.: US 8,697,799 B2
(45) Date of Patent: Apr. 15, 2014

(54) NON-AQUEOUS, LIQUID COATING COMPOSITIONS

(75) Inventors: Carmen Flosbach, Wuppertal (DE); Thomas Grawe, Leverkusen (DE)

(73) Assignee: Axalta Coating Systems IP Co., LLC, Wilmington, DE (US)

( * ) Notice: Subject to any disclaimer, the term of this patent is extended or adjusted under 35 U.S.C. 154(b) by 694 days.

(21) Appl. No.: 12/086,264

(22) PCT Filed: Dec. 1, 2006

(86) PCT No.: PCT/US2006/046048
§ 371 (c)(1),
(2), (4) Date: Jun. 5, 2008

(87) PCT Pub. No.: WO2007/067432
PCT Pub. Date: Jun. 14, 2007

(65) Prior Publication Data
US 2009/0285992 A1    Nov. 19, 2009

Related U.S. Application Data

(60) Provisional application No. 60/749,254, filed on Dec. 9, 2005.

(51) Int. Cl.
*C08G 18/28* (2006.01)
*C08L 75/00* (2006.01)

(52) U.S. Cl.
USPC ........... 524/590; 524/589; 524/839; 524/840; 427/379; 427/385.5

(58) Field of Classification Search
USPC ............... 525/92 C, 455, 123, 124, 127, 131; 524/589, 590; 427/379, 385.5
See application file for complete search history.

(56) References Cited

U.S. PATENT DOCUMENTS

| | | | |
|---|---|---|---|
| 4,559,383 A | | 12/1985 | Holubka et al. |
| 5,221,707 A | * | 6/1993 | Chihara et al. ................ 524/267 |
| 5,756,634 A | | 5/1998 | Braunstein et al. |
| 5,852,101 A | * | 12/1998 | Halpaap et al. ............... 524/507 |
| 6,136,455 A | * | 10/2000 | Anyashiki et al. ............. 428/659 |
| 6,479,103 B1 | | 11/2002 | Wichelhaus et al. |
| 6,825,241 B1 | * | 11/2004 | Blum et al. ..................... 522/96 |
| 6,835,772 B2 | * | 12/2004 | Kita et al. ..................... 524/590 |
| 7,019,102 B2 | * | 3/2006 | Schoenfeld et al. ........... 528/45 |
| 7,087,676 B2 | * | 8/2006 | Mazanek et al. .............. 524/591 |
| 2004/0063851 A1 | * | 4/2004 | Neppl et al. .................. 524/589 |
| 2006/0079659 A1 | * | 4/2006 | Flosbach et al. .............. 528/44 |
| 2006/0173122 A1 | * | 8/2006 | Flosbach et al. .............. 524/507 |

FOREIGN PATENT DOCUMENTS

| | | |
|---|---|---|
| EP | 1937739 B1 | 5/2009 |
| EP | 1994104 B1 | 3/2010 |
| GB | 1286422 | 8/1972 |
| GB | 1472391 | 5/1977 |
| GB | 1529319 | 10/1978 |
| WO | 2005047406 A1 | 5/2005 |

OTHER PUBLICATIONS

European Coatings Handbook, Curt R. Vincentz Verlag, Hannover, 2000, pp. 64 to 66.
Th. Klimmasch and Th. Engbert, Development of a uniform laboratory test method for assessing the car-wash scratch resistance of automotive top coats, in DFO Proceedings 32, pp. 59 to 66, Technologie-Tage, Proceedings of the seminar on Apr. 29 and 30, 1997 in Cologne, published by Deutsche Forschungsgesellschaft für Oberflächenbehandlung e.V., Adersstraβe 94, 40215 Düsseldorf.
ISA European Patent Office, International Search Report and Written Opinion for Application No. PCT/US2006/046048, mailed Apr. 2, 2007.
ISA European Patent Office, International Preliminary Report on Patentability for Application No. PCT/US2006/046048, mailed Jun. 11, 2008.
European Patent Office, Examination Report for Application No. 06838809.9, dated Feb. 1, 2013.
Engler, D.J. et al. "Paint/Coatings Dictionary," Federation of Societies for Coatings Technology, 1978, p. 365.

\* cited by examiner

*Primary Examiner* — Michael L Leonard
(74) *Attorney, Agent, or Firm* — Ingrassia Fisher & Lorenz, P.C.

(57) ABSTRACT

Non-aqueous, liquid coating compositions which contain at least one polyurethane resin B with blocked isocyanate groups and at least one binder C with functional groups reactive towards the blocked isocyanate groups of B, wherein the at least one polyurethane resin B is present as particles having a melting temperature of 40 to 160° C.

10 Claims, No Drawings

NON-AQUEOUS, LIQUID COATING COMPOSITIONS

CROSS-REFERENCE TO RELATED APPLICATION

This is a continuation of International Application No. PCT/US2006/046048, filed Dec. 1, 2006, which was published under PCT Article 21(2), which claims the benefit of U.S. Provisional Application 60/749,254, filed Dec. 9, 2005.

FIELD OF THE INVENTION

The invention relates to novel non-aqueous, liquid coating compositions which contain binders that are cross-linkable by blocked polyisocyanate and blocked polyisocyanate cross-linking agents.

DESCRIPTION OF THE PRIOR ART

Non-aqueous, liquid coating compositions based on binders cross-linkable by blocked polyisocyanate, in particular hydroxyl-functional binders, and blocked polyisocyanate cross-linking agents are known. Examples are corresponding coating systems based on hydroxyl-functional acrylic resins (c.f. European Coatings Handbook, Curt R. Vincentz Verlag, Hannover, 2000, page 66).

It has now been found that the per se known non-aqueous, liquid coating compositions based on binders cross-linkable by blocked polyisocyanate, in particular hydroxyl-functional binders, and blocked polyisocyanate cross-linking agents may be improved if they contain, apart from or instead of the hitherto conventional blocked polyisocyanate cross-linking agents, a specific kind of polyurethane resins with blocked isocyanate groups. In this way, it is, for example, possible to achieve a higher solids content of the coating composition (even at an identical or slightly higher application viscosity), improved sagging properties (even at elevated temperatures) and improved technological properties, in particular, good stone chip resistance and good scratch resistance, of the coating layers produced with the coating compositions.

SUMMARY OF THE INVENTION

In a first embodiment, the invention is directed to non-aqueous, liquid coating compositions which contain at least one polyurethane resin B with blocked isocyanate groups as the only blocked isocyanate component and at least one binder C with functional groups reactive towards the blocked isocyanate groups of B, wherein the at least one polyurethane resin B is present as particles having a melting temperature of 40 to 160° C., in particular, 60 to 140° C.

DETAILED DESCRIPTION OF THE EMBODIMENTS

The term used in the present description and the claims "functional groups reactive towards blocked isocyanate groups" means in particular "functional groups which are capable of addition onto free isocyanate groups formed after elimination of the blocking agent from blocked isocyanate groups".

In a second embodiment of the invention the coating compositions mentioned above, i.e., the coating compositions corresponding to the first embodiment of the invention, additionally contain at least one blocked polyisocyanate A which is not solid at room temperature and/or is present in dissolved form, wherein the functional groups of the at least one binder C are reactive towards the blocked isocyanate groups of A as well. Thus, in the second embodiment the invention is directed to non-aqueous, liquid coating compositions which contain at least one blocked polyisocyanate A, at least one polyurethane resin B with blocked isocyanate groups and at least one binder C with functional groups reactive towards the blocked isocyanate groups of A and B, wherein the at least one blocked polyisocyanate A is not solid at room temperature and/or is present in dissolved form and wherein the at least one polyurethane resin B is present as particles having a melting temperature of 40 to 160° C., in particular, 60 to 140° C.

The coating compositions according to the invention are liquid, contain organic solvent(s) and have a solids content of, for example, 40 to 85 wt. %, preferably of 45 to 75 wt. %.

The solids content of the coating compositions consists of the resin solids content and the following optional components: pigments, fillers (extenders) and non-volatile additives.

The resin solids content of the coating compositions corresponding to the first embodiment of the invention comprises the at least one polyurethane resin B having blocked isocyanate groups and the binder solids content comprising the at least one binder C. In particular, the resin solids content of the coating compositions consists of 20 to 70, preferably 20 to 50 wt. % of the at least one polyurethane resin B, 30 to 80, preferably 50 to 80 wt. % of the at least one binder C and 0 to 30 wt. % of one or more components D, wherein the weight percentages add up to 100 wt. %. It is preferred, that the resin solids content does not comprise any component(s) D and that it consists of 20 to 70, preferably 20 to 50 wt. % of the at least one polyurethane resin B and 30 to 80 wt. %, preferably 50 to 80 wt. % of the binder solids content consisting of one or more binders C, wherein the weight percentages add up to 100 wt. %.

The resin solids content of the coating compositions corresponding to the second embodiment of the invention comprises a blocked isocyanate component consisting of the components A and B each having blocked isocyanate groups and the binder solids content comprising the at least one binder C. In particular, the resin solids content of the coating compositions consists of 20 to 70, preferably 20 to 50 wt. % of the blocked isocyanate component consisting of components A and B, 30 to 80, preferably 50 to 80 wt. % of the at least one binder C and 0 to 30 wt. % of one or more components D, wherein the weight percentages add up to 100 wt. %. It is preferred, that the resin solids content does not comprise any component(s) D and that it consists of 20 to 70, preferably 20 to 50 wt. % of the blocked isocyanate component consisting of components A and B and 30 to 80 wt. %, preferably 50 to 80 wt. % of the binder solids content consisting of one or more binders C, wherein the weight percentages add up to 100 wt. %.

The blocked isocyanate component consists of more than 0 to 90 wt. %, for example, 40 to 90 wt. %, preferably 40 to 80 wt. %, of the at least one blocked polyisocyanate A and 10 to less than 100 wt. %, for example, 10 to 60 wt. %, preferably 20 to 60 wt. %, of the at least one polyurethane resin B with blocked isocyanate groups, wherein the weight percentages add up to 100 wt. %. The molar ratio between the blocked isocyanate groups from the at least one blocked polyisocyanate A and the blocked isocyanate groups from the at least one polyurethane resin B in the coating compositions corresponding to the second embodiment of the invention is, for example, 20:1 to 0.5:1.

The at least one blocked polyisocyanate A contained in the coating compositions corresponding to the second embodiment of the invention comprises blocked polyisocyanates which are not solid at room temperature but are, for example, liquid, and/or are soluble in an organic solvent (mixture). Blocked polyisocyanates A soluble in an organic solvent (mixture) are present in dissolved form in the coating compositions containing organic solvent(s). Examples of blocked polyisocyanates A are conventional polyisocyanates known to the person skilled in the art, such as di- and/or polyisocyanates with aliphatically, cycloaliphatically, araliphatically and/or aromatically attached isocyanate groups blocked with conventional blocking agents known to the person skilled in the art. Particularly, the blocked isocyanate groups may be converted back into free isocyanate groups at elevated temperature with elimination of the blocking agent and are then available as reaction partners for the corresponding functional groups of the at least one binder C, which functional groups are reactive towards the isocyanate groups from which the blocking agent has then been removed. The latent isocyanate content of the blocked polyisocyanates A is in general in a range from 2 to 33.6 wt. %, preferably from 5 to 25 wt. %, calculated as NCO (molar mass 42) and relative to the corresponding free, i.e. unblocked polyisocyanates on which the blocked polyisocyanates A are based.

Examples of corresponding free diisocyanates on which type A blocked diisocyanates are based are hexamethylene diisocyanate, tetramethylxylylene diisocyanate, isophorone diisocyanate, dicyclohexylmethane diisocyanate, cyclohexane diisocyanate, toluoylene diisocyanate, and diphenylmethane diisocyanate.

Examples of corresponding free polyisocyanates on which type A blocked polyisocyanates are based are that kind which contain heteroatoms in the residue linking the isocyanate groups. Examples of these are free polyisocyanates which comprise carbodiimide groups, allophanate groups, isocyanurate groups, urethane groups, acylated urea groups or biuret groups. The free polyisocyanates have an isocyanate functionality higher than 2, such as, for example, polyisocyanates of the uretidione or isocyanurate type produced by di- and/or trimerization of the free diisocyanates stated in the above paragraph. Further examples are polyisocyanates containing biuret groups produced by reaction of the free diisocyanates stated in the above paragraph with water. Further examples are likewise free polyisocyanates containing urethane groups produced by reaction with polyols.

Examples of free polyisocyanates which are very highly suitable as the basis for blocked polyisocyanates A are the polyisocyanate crosslinking agents known for isocyanate-curing coating systems and based on hexamethylene diisocyanate, on isophorone diisocyanate and/or on dicyclohexylmethane diisocyanate. Examples are the per se known derivatives of these diisocyanates comprising biuret, urethane, uretidione and/or isocyanurate groups. Examples thereof may be found among the products known by the name Desmodur® sold by Bayer Material Science.

As already stated, the blocked polyisocyanates A have isocyanate groups which are blocked with conventional blocking agents known to the person skilled in the art. Examples for blocking agents that may be used alone or in combination are monofunctional compounds known for blocking isocyanates, such as, the CH-acidic, NH—, SH— or OH-functional compounds known for this purpose. Examples are CH-acidic compounds, such as, acetylacetone or CH-acidic esters, such as, acetoacetic acid alkyl esters, malonic acid dialkyl esters; aliphatic or cycloaliphatic alcohols, such as, n-butanol, 2-ethylhexanol, cyclohexanol; glycol ethers, such as butyl glycol, butyl diglycol; phenols; oximes, such as, methyl ethyl ketoxime, acetone oxime, cyclohexanone oxime; lactams, such as, caprolactam; azole blocking agents of the imidazole, pyrazole, triazole or tetrazole type.

The polyurethane resins B contained in the coating compositions corresponding to the first as well as to the second embodiment of the invention are different from the at least one blocked polyisocyanate A and therefore, are not to be confused with each other. The polyurethane resins B have blocked isocyanate groups. Particularly, the blocked isocyanate groups may be converted back into free isocyanate groups at elevated temperature with elimination of the blocking agent and are then available as reaction partners for the corresponding functional groups of the at least one binder C, which functional groups are reactive towards the isocyanate groups from which the blocking agent has then been removed.

The polyurethane resins B are present in the coating compositions as particles, in particular, with a non-spherical shape, and have a melting temperature of 40 to 160° C., in particular 60 to 140° C. The melting temperatures are not in general sharp melting points, but instead the upper end of melting ranges with a breadth of, for example, 30 to 150° C. The melting ranges and thus, the melting temperatures may be determined, for example, by DSC (differential scanning calorimetry) at heating rates of 10 K/min. The latent isocyanate content of the polyurethane resins B is, for example, in the range from 2 to 21.2 wt. %, calculated as NCO and relative to the corresponding underlying polyurethane resins, i.e., which are free of blocking agent(s).

The polyurethane resins B are insoluble or virtually insoluble in the coating compositions and are present therein as particles. The polyurethane resins B are only very slightly, if at all, soluble in organic solvents conventional in coatings, the solubility amounting, for example, to less than 10, in particular less than 5 g per liter of butyl acetate at 20° C.

The production of polyurethane resins with blocked isocyanate groups is known to the person skilled in the art; in particular, they may be produced by reacting polyol(s) with polyisocyanate(s) in excess and reacting the excess free isocyanate groups with one or more monofunctional blocking agents, as are, for example, listed above in connection with the blocked polyisocyanates A. Polyols suitable for the production of the polyurethane resins B are not only polyols in the form of low molar mass compounds defined by empirical and structural formula but also oligomeric or polymeric polyols with number-average molar masses of, for example, up to 800, for example, corresponding hydroxyl-functional polyethers, polyesters or polycarbonates; low molar mass polyols defined by an empirical and structural formula are, however, preferred. The person skilled in the art selects the nature and proportion of the polyisocyanates, the polyols and the blocking agents for the production of polyurethane resins B in such a manner that polyurethane resins B with the above-mentioned melting temperatures and the above-mentioned solubility behavior are obtained.

All the number-average molar mass data stated in the present description and the claims are number-average molar masses determined or to be determined by gel permeation chromatography (GPC; divinylbenzene-crosslinked polystyrene as the immobile phase, tetrahydrofuran as the liquid phase, polystyrene standards).

The polyurethane resins B may be produced in the presence of a suitable organic solvent (mixture), which, however, makes it necessary to isolate the polyurethane resins B obtained in this manner or remove the solvent therefrom.

Preferably the production of the polyurethane resins B is, however, carried out without solvent and without subsequent purification operations.

In a first preferred variant, the polyurethane resins B are polyurethanes with two blocked isocyanate groups per molecule which can be prepared by reacting 1,6-hexane diisocyanate with a diol component and with at least one monofunctional blocking agent in the molar ratio x:(x−1):2, wherein x means any desired value from 2 to 6, preferably, from 2 to 4, and the diol component is one single diol, in particular, one single (cyclo)aliphatic diol with a molar mass in the range of 62 to 600, or a combination of diols, preferably two to four, in particular, two or three diols, wherein, in the case of a diol combination each of the diols preferably constitutes at least 10 mol % of the diols of the diol component. In the case of a diol combination, it is preferred, that at least 70 mol %, in particular, 100 mol % of the diols are (cyclo)aliphatic diols, each with a molar mass in the range of 62 to 600.

The term "(cyclo)aliphatic" used in the present description and the claims encompasses cycloaliphatic, linear aliphatic, branched aliphatic and cycloaliphatic with aliphatic residues. Diols differing from (cyclo)aliphatic diols accordingly comprise aromatic or aralipathic diols with aromatically and/or aliphatically attached hydroxyl groups. One example is bisphenol A. Diols differing from (cyclo)aliphatic diols may furthermore comprise oligomeric or polymeric diols with number-average molar masses of, for example, up to 800, for example, corresponding polyether, polyester or polycarbonate diols.

The production of the polyurethanes with two blocked isocyanate groups per molecule can be carried out in the presence of a suitable organic solvent (mixture), followed by isolation of the polyurethanes so prepared. Preferably, the production is carried out without solvent and without subsequent purification operations.

1,6-hexane diisocyanate, diol component and the at least one monofunctional blocking agent are reacted stoichiometrically with one another in the molar ratio x mol 1,6-hexane diisocyanate:x−1 mol diol:2 mol blocking agent, wherein x means any desired value from 2 to 6, preferably from 2 to 4.

One single diol, in particular, one single (cyclo)aliphatic diol with a molar mass in the range of 62 to 600 is used as the diol component. It is also possible to use a combination of diols, preferably two to four, in particular, two or three diols, wherein each of the diols preferably constitutes at least 10 mol % of the diols of the diol component and wherein it is further preferred, that at least 70 mol %, in particular 100 mol % of the diols are (cyclo)aliphatic diols, each with a molar mass in the range of 62 to 600.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of diols which are possible as one single diol of the diol component are ethylene glycol, the isomeric propane- and butanediols, 1,5-pentanediol, 1,6-hexanediol, 1,10-decanediol, 1,12-dodecanediol, 1,4-cyclohexanedimethanol, hydrogenated bisphenol A and dimer fatty alcohol.

Examples of diols which are possible as constituent of the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and ethylene glycol, the isomeric propane- and butanediols, 1,5-pentanediol, 1,6-hexanediol, 1,10-decanediol, 1,12-dodecanediol, neopentyl glycol, butylethylpropanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 62 to 600.

Preferably, only one monofunctional blocking agent is used. Examples of the at least one monofunctional blocking agent are the same as those listed above as examples in connection with the blocked polyisocyanates A.

1,6-hexane diisocyanate, the diol(s) of the diol component and the at least one monofunctional blocking agent are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, 1,6-hexane diisocyanate may be reacted initially with blocking agent and then with the diol(s) of the diol component or initially with the diol(s) of the diol component and then with blocking agent. However, the diol component may, for example, also be divided into two or more portions, for example, also into the individual diols, for example, such that 1,6-hexane diisocyanate is reacted initially with part of the diol component before further reaction with blocking agent and finally with the remaining proportion of the diol component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule their molar masses calculated with the example of butanone oxime as the only blocking agent used are in the range of 572 or above, for example, up to 2000.

The polyurethanes with two blocked isocyanate groups per molecule assume the form of a mixture exhibiting a molar mass distribution. The polyurethanes with two blocked isocyanate groups per molecule do not, however, require working up and may be used directly as polyurethane resins B.

In a second preferred variant, the polyurethane resins B are polyurethanes with two blocked isocyanate groups per molecule which can be prepared by reacting a diisocyanate component, a diol component and at least one monofunctional blocking agent in the molar ratio x:(x−1):2, wherein x means any desired value from 2 to 6, preferably, from 2 to 4, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluoylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-$C_2$-$C_{12}$-diol, and 0 to 80 mol % by at least one diol that is different from linear aliphatic alpha,omega-$C_2$-$C_{12}$-diols, wherein each diol of the diol component preferably forms at least 10 mol % within the diol component, and wherein the mol % of the respective diols add up to 100 mol %.

The production of the polyurethanes with two blocked isocyanate groups per molecule can be carried out in the presence of a suitable organic solvent (mixture), followed by isolation of the polyurethanes so prepared. Preferably, the production is carried out without solvent and without subsequent purification operations.

The diisocyanate component, the diol component and the at least one monofunctional blocking agent are reacted stoichiometrically with one another in the molar ratio x mol diisocyanate:x−1 mol diol:2 mol blocking agent, wherein x represents any value from 2 to 6, preferably from 2 to 4.

50 to 80 mol % of the diisocyanate component is formed by 1,6-hexane diisocyanate, and 20 to 50 mol % by one or two diisocyanates selected from the group consisting of toluoylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein if two diisocyanates are selected, each diisocyanate forms at least 10 mol % of the diisocyanates of the diisocyanate component. Preferably, the diisocyanate or the two diisocyanates, forming in total 20 to 50 mol % of the diisocyanate component, are selected from dicyclohexylmethane diisocyanate, isophorone diisocyanate, trimethylhexane diisocyanate, cyclohexane diisocyanate, cyclohexanedimethylene diisocyanate and tetramethylenexylylene diisocyanate.

The diol component consists to an extent of 20 to 100 mol % of at least one linear aliphatic alpha,omega-$C_2$-$C_{12}$-diol and to an extent of 0 to 80 mol % of at least one diol differing from linear aliphatic alpha,omega-$C_2$-$C_{12}$-diols. The diol component preferably consists of no more than four different diols, in particular, only of one to three diols. In the case of only one diol, it accordingly comprises a linear aliphatic alpha,omega-$C_2$-$C_{12}$-diol. In the case of a combination of two, three or four diols, the diol component consists to an extent of 20 to 100 mol %, preferably of 80 to 100 mol %, of at least one linear aliphatic alpha,omega-$C_2$-$C_{12}$-diol and to an extent of 0 to 80 mol %, preferably of 0 to 20 mol % of at least one diol differing from linear aliphatic alpha,omega-$C_2$-$C_{12}$-diols and preferably, also from alpha,omega-diols with more than 12 carbon atoms. The at least one diol differing from linear aliphatic alpha,omega-$C_2$-$C_{12}$-diols and preferably, also from alpha,omega-diols with more than 12 carbon atoms comprises in particular (cyclo)aliphatic diols defined by empirical and structural formula and with a low molar mass in the range of 76 to 600. The proportion of possible non-(cyclo)aliphatic diols preferably amounts to no more than 30 mol % of the diols of the diol component. In the case of a diol combination, each diol preferably makes up at least 10 mol % of the diol component.

Preferably, the diol component does not comprise any non-(cyclo)aliphatic diols. Most preferably, it does not comprise any diols that are different from linear aliphatic alpha,omega-$C_2$-$C_{12}$-diols, but rather consists of one to four, preferably, one to three, and in particular, only one linear aliphatic alpha,omega-$C_2$-$C_{12}$-diol.

In the case of the diol combination, the diol component may be introduced as a mixture of its constituent diols or the diols constituting the diol component may be introduced individually into the synthesis. It is also possible to introduce a proportion of the diols as a mixture and to introduce the remaining proportion(s) in the form of pure diol.

Examples of linear aliphatic alpha,omega-$C_2$-$C_{12}$-diols that may be used as one single diol or as constituent of the diol component are ethylene glycol, 1,3-propanediol, 1,4-butanediol, 1,5-pentanediol, 1,6-hexanediol, 1,10-decanediol and 1,12-dodecanediol.

Examples of diols that are different from linear aliphatic alpha,omega-$C_2$-$C_{12}$-diols and may be used in the diol component are telechelic (meth)acrylic polymer diols, polyester diols, polyether diols, polycarbonate diols, each with a number-average molar mass of, for example, up to 800 as representatives of oligomeric or polymeric diols, bisphenol A as a representative of low molar mass non-(cyclo)aliphatic diols defined by empirical and structural formula and those isomers of propanediol and butanediol that are different from the isomers of propanediol and butanediol specified in the preceding paragraph, as well as, neopentyl glycol, butyl ethyl propanediol, the isomeric cyclohexanediols, the isomeric cyclohexanedimethanols, hydrogenated bisphenol A, tricyclodecanedimethanol, and dimer fatty alcohol as representatives of (cyclo)aliphatic diols defined by empirical and structural formula with a low molar mass in the range of 76 to 600.

Preferably, only one monofunctional blocking agent is used. Examples of the at least one monofunctional blocking agent are the same as those listed above as examples in connection with the blocked polyisocyanates A.

The diisocyanates of the diisocyanate component, the diol(s) of the diol component and the at least one monofunctional blocking agent are preferably reacted together in the absence of solvents. The reactants may here all be reacted together simultaneously or in two or more synthesis stages. When the synthesis is performed in multiple stages, the reactants may be added in the most varied order, for example, also in succession or in alternating manner. For example, the diisocyanates of the diisocyanate component may be reacted initially with blocking agent and then with the diol(s) of the diol component or initially with the diol(s) of the diol component and then with blocking agent. However, the diol component may, for example, also be divided into two or more portions, for example, also into the individual diols, for example, such that the diisocyanates of the diisocyanate component are reacted initially with part of the diol component before further reaction with blocking agent and finally with the remaining proportion of the diol component. In a very similar manner, however, the diisocyanate component may, for example, also be divided into two or more portions, for example, also into the individual diisocyanates, for example, such that the diol component and blocking agent are reacted initially with part of the diisocyanate component and finally with the remaining proportion of the diisocyanate component. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvent is complete and the reaction mixture has cooled, solid polyurethanes with two blocked isocyanate groups per molecule are obtained. When low molar mass diols defined by empirical and structural formula are used for synthesis of the polyurethanes with two blocked isocyanate groups per molecule, their molar masses calculated with the example of butanone oxime as the only blocking agent used are in the range of 570 or above, for example, up to 2000.

The polyurethanes with two blocked isocyanate groups per molecule assume the form of a mixture exhibiting a molar mass distribution. The polyurethanes with two blocked isocyanate groups per molecule do not, however, require working up and may be used directly as polyurethane resins B.

In a third preferred variant, the polyurethane resins B are polyurethanes with blocked isocyanate groups which can be prepared by reacting a trimer of a (cyclo)aliphatic diisocyanate, 1,6-hexanediisocyanate, a diol component and at least one monofunctional blocking agent in the molar ratio 1:x:x:3, wherein x means any desired value from 1 to 6, preferably, from 1 to 3, wherein the diol component is one single linear aliphatic alpha,omega $C_2$-$C_{12}$ diol or a combination of two to four, preferably, two or three, (cyclo)aliphatic diols, wherein in the case of diol combination, each of the diols makes up at least 10 mol % of the diols of the diol combination and the diol combination consists of at least 80 mol % of at least one linear aliphatic alpha,omega $C_2$-$C_{12}$ diol.

The production of the polyurethanes with blocked isocyanate groups can be carried out in the presence of a suitable organic solvent (mixture), followed by isolation of the polyurethanes so prepared. Preferably, the production is carried out without solvent and without subsequent purification operations.

The trimer of the (cyclo)aliphatic diisocyanate, 1,6-hexanediisocyanate, the diol component and the at least one monofunctional blocking agent are reacted stoichiometrically with one another in the molar ratio 1 mol trimer of the (cyclo)aliphatic diisocyanate:x mol 1,6-hexanediisocyanate:x mol diol:3 mol blocking agent, wherein x represents any value from 1 to 6, preferably from 1 to 3.

The trimer of the (cyclo)aliphatic diisocyanate is polyisocyanates of the isocyanurate type, prepared by trimerization of a (cyclo)aliphatic diisocyanate. Appropriate trimerization products derived, for example, from 1,4-cyclohexanedimethylenediisocyanate, in particular, from isophorondiisocyanate and more particularly, from 1,6-hexanediisocyanate, are suitable. The industrially obtainable isocyanurate polyisocyanates generally contain, in addition to the pure trimer, i.e., the isocyanurate made up of three diisocyanate molecules and comprising three NCO functions, isocyanate-functional secondary products with a relatively high molar mass. Products with the highest possible degree of purity are preferably used. In each case, the trimers of the (cyclo)aliphatic diisocyanates obtainable in industrial quality are regarded as pure trimer irrespective of their content of said isocyanate-functional secondary products with respect to the molar ratio of 1 mol trimer of the (cyclo)aliphatic diisocyanate:x mol 1,6-hexanediisocyanate:x mol diol:3 mol blocking agent.

One single linear aliphatic alpha,omega $C_2$-$C_{12}$ diol or combinations of two to four, preferably of two or three, (cyclo)aliphatic diols are used as the diol component. The diol combination preferably consists of two to four, in particular, two or three, linear aliphatic alpha,omega $C_2$-$C_{12}$ diols.

Examples of one single linear aliphatic alpha,omega $C_2$-$C_{12}$ diol or linear aliphatic alpha,omega $C_2$-$C_{12}$ diols which can be used within the diol combination are ethylene glycol, 1,3-propanediol, 1,4-butanediol, 1,5-pentanediol, 1,6-hexanediol, 1,10-decanediol and 1,12-dodecanediol.

Examples of (cyclo)aliphatic diols which can be used within the diol combination in addition to the at least one linear aliphatic alpha,omega $C_2$-$C_{12}$ diol making up at least 80 mol % of the diol combination are the further isomers of propane and butane diol, different from the isomers of propane and butane diol cited in the preceding paragraph, and neopentylglycol, butylethylpropanediol, the isomeric cyclohexane diols, the isomeric cyclohexanedimethanols, hydrogenated bisphenol A and tricyclodecanedimethanol.

In the case of the diol combination, the mixture of the diols making up the combination can be used in the synthesis process or the diols making up the diol combination are each used individually in the synthesis. It is also possible to use a portion of the diols as a mixture and the remaining fraction(s) in the form of pure diol.

In the case of the diol combination, preferred diol combinations totaling 100 mol % in each case are combinations of 10 to 90 mol % 1,3-propanediol with 90 to 10 mol % 1,5-pentanediol, 10 to 90 mol % 1,3-propanediol with 90 to 10 mol % 1,6-hexanediol and 10 to 90 mol % 1,5-pentanediol with 90 to 10 mol % 1,6-hexanediol.

Preferably, only one monofunctional blocking agent is used. Examples of the at least one monofunctional blocking agent are the same as those listed above as examples in connection with the blocked polyisocyanates A.

The trimer of the (cyclo)aliphatic diisocyanate, 1,6-hexane-diisocyanate, the diol component and the at least one monofunctional blocking agent are preferably reacted together in the absence of solvents. The reactants may here all be reacted together simultaneously or in two or more synthesis stages. Synthesis procedures in which the blocking agent or the diol component and the trimer of the (cyclo)aliphatic diisocyanate alone are reacted with one another are preferably avoided. When the synthesis is performed in multiple stages, the reactants may be added in the most varied order, for example, also in succession or in alternating manner. For example, 1,6-hexane diisocyanate may be reacted initially with a mixture of diol component and blocking agent and then with the trimer of the (cyclo)aliphatic diisocyanate or a mixture of the isocyanate-functional components with the diol component and blocking agent or a mixture of the isocyanate-functional components may be reacted initially with blocking agent and then with the diol component. In the case of a diol combination, the diol component may, for example, also be divided into two or more portions, for example, also into the individual (cyclo)aliphatic diols. The individual reactants may in each case be added in their entirety or in two or more portions. The reaction is exothermic and proceeds at a temperature above the melting temperature of the reaction mixture. The reaction temperature is, for example, 60 to 200° C. The rate of addition or quantity of reactants added is accordingly determined on the basis of the degree of exothermy and the liquid (molten) reaction mixture may be maintained within the desired temperature range by heating or cooling.

Once the reaction carried out in the absence of solvents is complete and the reaction mixture has cooled, solid polyurethanes with blocked isocyanate groups and with number average molar masses in the range of 1,500 to 4,000 are obtained. The polyurethanes with blocked isocyanate groups do not require working up and may be used directly as polyurethane resins B.

The at least one polyurethane resin B is present in particulate form, in particular, in the form of particles with a non-spherical shape, in the coating compositions. The average particle size (mean particle diameter) of the polyurethane resin B particles determined by means of laser diffraction is, for example, 1 to 100 µm. The polyurethane resin B particles may be formed by grinding (milling) of the solid polyurethane resin(s) B; for example, conventional powder coat production technology may be used for that purpose. The polyurethane resin B particles may either be stirred or mixed as a ground powder into the liquid coating composition or liquid constituents thereof, wherein it is possible subsequently to perform additional wet grinding or dispersing of the polyurethane resin B particles, for example, by means of a bead mill, in the resultant suspension.

A further method for forming the polyurethane resin B particles involves hot dissolution of the at least one polyurethane resin B in a dissolution medium and subsequent polyurethane resin B particle formation during and/or after cooling. In the case of the second embodiment of the invention, dissolution of the at least one polyurethane resin B may be performed in particular in a proportion or the entirety of component A with heating, for example, to the melting temperature or above, for example, to temperatures of 40 to above 180° C., whereupon the polyurethane resin B particles may form during and/or after the subsequent cooling. The component A used as dissolution medium for the at least one polyurethane resin B may here be present liquid as such or as a solution in an organic solvent (mixture). Thorough mixing or stirring is preferably performed during cooling. Dissolution of the at least one polyurethane resin B may also be performed with heating in an organic solvent (mixture), wherein the formation of the polyurethane resin B particles, which proceeds during and/or after the subsequent cooling, may proceed in the solvent itself. Here, in case of the second embodiment of the invention, it is also possible to allow the formation of the polyurethane resin B particles after mixing of the resultant, as yet uncooled solution with the component A. By using the method of hot dissolution and subsequent polyurethane resin B particle formation during and/or after cooling, it is in particular possible to produce polyurethane resin B particles with average particle sizes at the lower end of the range of average particle sizes, for example, in the range of 1 to 50 µm, in particular 1 to 30 µm.

As already stated, the coating compositions contain at least one binder C with functional groups reactive towards the blocked isocyanate groups of B or, in case of the second embodiment of the invention, of A and B, for example, functional groups comprising active hydrogen. The binders C in particular comprise conventional hydroxyl-functional binders. Binders C with hydroxyl groups which may be considered are conventional hydroxyl-functional binders known to the person skilled in the art. Examples are polyester, polyurethane and (meth)acrylic copolymer resins and hybrid binders derived from these classes of binders, in each case with hydroxyl values of, for example, 60 to 300 mg of KOH/g and number-average molar masses of, for example, 500 to 10000.

The molar ratio of functional groups reactive towards blocked isocyanate groups, in particular, hydroxyl groups, from the at least one binder C to blocked isocyanate groups of B or, in case of the second embodiment of the invention, of A and B is, for example, 0.5:1 to 3:1, in particular 0.7:1 to 2:1.

The coating compositions according to the invention may contain one or more components D which contribute towards the resin solids content. The term "components D" encompasses components free of functional groups which are reactive towards blocked isocyanate groups, such as, in particular, hydroxyl groups, and also free of blocked isocyanate groups. These comprise in particular corresponding resins and/or crosslinking agents. Examples of type D resins are physically drying resins or resins which may be chemically cured by reactions other than the reaction of functional groups reactive towards blocked isocyanate groups, such as, in particular, hydroxyl groups, with blocked isocyanate groups. Examples of type D crosslinking agents are in particular conventional crosslinking agents known to the person skilled in the art, in particular for coating systems based on hydroxy-functional binders, such as, for example, transesterification crosslinking agents; amino resin crosslinking agents, such as, melamine-formaldehyde resins; and/or trisalkoxycarbonylaminotriazine crosslinking agents.

One, some or each of components B, C and D may contain free-radically polymerizable olefinic double bonds. The coating compositions may then be cured not only by the reaction of the blocked isocyanate groups of B or, in case of the second embodiment of the invention, of A and B with the functional groups of the binder(s) C which are reactive towards blocked isocyanate groups, but additionally by free-radical polymerization of the olefinic double bonds, in particular by photochemically induced free-radical polymerization. Such compositions are also known as "dual-cure" coating compositions.

The coating compositions according to the invention contain organic solvent(s) and they have a solids content of, for example, 40 to 85 wt. %, preferably, 45 to 75 wt. %. The organic solvent content is, for example, 15 to 60 wt. %, preferably, 25 to 55 wt. %; the sum of the wt.-% of the solids content and the organic solvent content is here, for example, 90 to 100 wt.-% (any possible difference in the corresponding range of above 0 to 10 wt.-% to make up to the total of 100 wt. % is in general formed by volatile additives). The organic solvents are in particular conventional coating solvents, for example, glycol ethers, such as, butyl glycol, butyl diglycol, dipropylene glycol dimethyl ether, dipropylene glycol monomethyl ether, ethylene glycol dimethylether; glycol ether esters, such as, ethyl glycol acetate, butyl glycol acetate, butyl diglycol acetate, methoxypropyl acetate; esters, such as, butyl acetate, isobutyl acetate, amyl acetate; ketones, such as, methyl ethyl ketone, methyl isobutyl ketone, diisobutyl ketone, cyclohexanone, isophorone; alcohols, such as, methanol, ethanol, propanol, butanol; N-alkyl pyrrolidones, such as, N-methylpyrrolidone; aromatic hydrocarbons, such as, xylene, Solvesso® 100 (mixture of aromatic hydrocarbons with a boiling range from 155° C. to 185° C.), Solvesso® 150 (mixture of aromatic hydrocarbons with a boiling range from 182° C. to 202° C.) and aliphatic hydrocarbons.

Apart from the solvents, the coating compositions may contain further conventional coating additives, for example, inhibitors, catalysts, levelling agents, wetting agents, anticratering agents, antioxidants and/or light stabilizers. The additives are used in conventional amounts known to the person skilled in the art. In case of dual cure coating compositions, generally used photoinitiators are contained therein.

The coating compositions may also contain transparent pigments, color-imparting and/or special effect-imparting pigments and/or fillers, for example, corresponding to a ratio by weight of pigment plus filler: resin solids content in the range from 0:1 to 2:1. Suitable color-imparting pigments are any conventional coating pigments of an organic or inorganic nature. Examples of inorganic or organic color-imparting pigments are titanium dioxide, iron oxide pigments, carbon black, azo pigments, phthalocyanine pigments, quinacridone pigments and pyrrolopyrrole pigments. Examples of special effect pigments are metal pigments, for example, of aluminum, copper or other metals, interference pigments, such as, for example, metal oxide-coated metal pigments, for example, iron oxide-coated aluminum, coated mica, such as, for example, titanium dioxide-coated mica, graphite effect-imparting pigments, iron oxide in flake form, liquid crystal pigments, coated aluminum oxide pigments, coated silicon dioxide pigments. Examples of fillers are silicon dioxide, aluminum silicate, barium sulfate, calcium carbonate and talc.

The coating compositions according to the invention are non-aqueous liquid coating compositions. However, it is also possible to prepare similar aqueous coating compositions which contain at least one polyurethane resin of the B type present as particles having a melting temperature of 40 to 180° C. In that case the binders of the C type may be converted into the aqueous phase, for example, with addition of external emulsifiers and water. Nonaqueous, but water-dilutable binders of the C type contain conventional hydrophilic groups. Examples of these are nonionic hydrophilic groups, such as polyethylene oxide units, and/or ionic groups or groups convertible into ionic groups. Such binders may be converted into the aqueous phase by addition of water or by addition of neutralizing agent and water. If an aqueous coating composition is produced it is preferred to add the at least one polyurethane resin of the B type to the at least one water-dilutable binder of the C type before converting the latter into the aqueous phase.

The coating compositions may be used for the production of single-layer coatings or for the production of one or more coating layers within a multilayer coating, such as, in particular, an automotive multilayer coating, either on an automotive body or on an automotive body part. This may relate to both original and repair coating applications. The coating compositions may in particular be used in pigmented form for the production of a primer surfacer layer or in pigment-free form for the production of an outer clear top coat layer or a transparent sealing layer of a multilayer coating. They may, for example, be used for the production of a clear top coat layer on a previously applied color-imparting and/or special effect-imparting base coat layer.

The coating compositions may be applied by means of conventional application methods, in particular, by spraying onto any desired uncoated or precoated substrates, for example, of metal or plastics. The coating compositions may exhibit low application viscosities at a comparatively high resin solids content. This is advantageous in the case of spray application, because it is possible, for example, then to use conventional spray application units, as are used for the application of liquid coatings in industrial coating facilities.

Once applied, layers of the coating compositions may initially be flashed off to remove solvent, for example, for one to five minutes at 20 to 80° C. Thermal curing then proceeds at object temperatures above the melting temperature of the polyurethane resin(s) B contained in the corresponding coating composition, for example, for 5 to 30 minutes at 40 to 200° C., preferably 80 to 180° C., for example, by baking. If the difference between the melting temperature and the actual curing temperature is sufficiently large, it is possible initially to effect only or substantially only the melting of the polyurethane resin B particles, before the actual crosslinking subsequently proceeds during and/or after a further increase in temperature to the curing temperature. During and/or after melting the polyurethane resin B particles the polyurethane resin B may become incorporated into the resin matrix.

If the coating compositions according to the invention are dual-cure coating compositions, thermal curing is combined with curing by free-radical polymerization of olefinic double bonds induced by irradiation with high-energy radiation, in particular, UV radiation. Thermal curing and radiation curing may here proceed simultaneously or in any desired order. Melting of the polyurethane resin B particles must, however, be ensured prior to curing.

EXAMPLES

Examples 1a to 1h

Preparation of Polyurethanes with Two Blocked Isocyanate Groups

Polyurethanes with two blocked isocyanate groups were produced by reacting 1,6-hexane diisocyanate with diols and butanone oxime in accordance with the following general synthesis method:

1,6-hexane diisocyanate (HDI) was initially introduced into a 2 liter four-necked flask equipped with a stirrer, thermometer and column and 0.01 wt. % dibutyltin dilaurate, relative to the initially introduced quantity of HDI, were added. The reaction mixture was heated to 60° C. Butanone oxime was then apportioned in such a manner that the temperature did not exceed 80° C. The reaction mixture was stirred at 80° C. until the theoretical NCO content had been reached. Once the theoretical NCO content had been reached, the diols A, B, C were added one after the other, in each case in a manner such that a temperature of 140° C. was not exceeded. In each case, the subsequent diol was not added until the theoretical NCO content had been reached. The reaction mixture was stirred at a maximum of 140° C. until no free isocyanate could be detected. The hot melt was then discharged and allowed to cool and solidify.

The melting behavior of the resultant polyurethanes with two blocked isocyanate groups was investigated by means of DSC (differential scanning calorimetry, heating rate 10 K/min).

Examples 1a to 1h are shown in Table 1. The Table states which reactants were reacted together in what molar ratios and the final temperature of the melting process measured by DSC is stated in °C.

TABLE 1

| Example | Mols HDI | Mols butanone oxime | Mols diol A | Mols diol B | Mols diol C | FT |
|---------|----------|---------------------|-------------|-------------|-------------|------|
| 1a | 3 | 2 | 1 PROP | 1 HEX | | 125° C. |
| 1b | 3 | 2 | 0.5 PROP | 1.5 HEX | | 131° C. |
| 1c | 3 | 2 | 2 PENT | | | 127° C. |
| 1d | 4 | 2 | 1 PENT | 1 PROP | 1 HEX | 113° C. |
| 1e | 3 | 2 | 1 PENT | 1 HEX | | 114° C. |
| 1f | 3 | 2 | 0.1 DFA | 1 PROP | 0.9 HEX | 101° C. |
| 1g | 3 | 2 | 0.7 MPD | 0.7 PENT | 0.6 DEC | 121° C. |
| 1h | 3 | 2 | 0.6 HEX | 0.7 PENT | 0.7 PROP | 115° C. |

FT: Final temperature of the melting process
DEC: 1,10-decanediol
DFA: dimer fatty alcohol
HEX: 1,6-hexanediol
MPD: 2-methyl-1,3-propanediol
PENT: 1,5-pentanediol
PROP: 1,3-propanediol Examples 2a to 2i Preparation of Polyurethanes with Blocked Isocyanate Groups Polyurethanes with blocked isocyanate groups were produced by reacting t-HDI (trimeric hexanediisocyanate; Desmodur® N3600 from Bayer), HDI, a diol component and butanone oxime in accordance with the following general synthesis method:

A mixture of t-HDI and HDI was initially introduced into a 2 liter four-necked flask equipped with a stirrer, thermometer and column and 0.01% by weight dibutyl tin dilaurate, based on the quantity of isocyanate introduced, were added. The reaction mixture was heated to 60° C. A mixture of butanone oxime and diol(s) was then added such that 140° C. was not exceeded. The temperature was carefully increased to a maximum of 140° C. and the mixture stirred until no more free isocyanate could be detected. The hot melt was then discharged and allowed to cool and solidify.

The melting behavior of the resultant polyurethanes with blocked isocyanate groups was investigated by means of DSC (heating rate 10 K/min).

Examples 2a to 2i are shown in Table 2. The table states which reactants were reacted together and in which molar ratios and the final temperature of the melting process measured using DSC is indicated in °C.

TABLE 2

| Example | Mols of t-HDI | Mols of HDI | Mols of butanone oxime | Mols of diol A | Mols of diol B | FT |
|---|---|---|---|---|---|---|
| 2a | 1 | 3 | 3 | 2.5 PROP | 0.5 PENT | 109° C. |
| 2b | 1 | 3 | 3 | 2.5 PROP | 0.5 DEC | 114° C. |
| 2c | 1 | 3 | 3 | 3 PROP |  | 112° C. |
| 2d | 1 | 3 | 3 | 1.5 PROP | 1.5 HEX | 108° C. |
| 2e | 1 | 3 | 3 | 3 PENT |  | 116° C. |
| 2f | 1 | 3 | 3 | 3 HEX |  | 122° C. |
| 2g | 1 | 2 | 3 | 1 PROP | 1 HEX | 102° C. |
| 2h | 1 | 2 | 3 | 2 PENT |  | 99° C. |
| 2i | 1 | 2 | 3 | 2 HEX |  | 118° C. |

Example 3

Production of a Clear Coat Composition and an Outer Clear Coat Layer of a Multi-Layer Coating for Comparison Purposes A clear coat was prepared by mixing the following components:
53.3 pbw (parts by weight) of a 65 wt-% solution of a methacrylic copolymer (acid value 20 mg KOH/g, hydroxyl value 119 mg KOH/g) in a 4:1 mixture of Solvesso®100 and butanol
25.0 pbw of a 75 wt-% solution of t-HDI fully blocked with butanone oxime in Solvesso®100
11.8 pbw of Solvesso® 150
0.9 pbw of Tinuvin® 1130 from Ciba (UV absorber)
0.9 pbw of Tinuvin® 144 from Ciba (light protecting agent)
0.9 pbw of Nacure® 5225 from King (catalyst)
4.2 pbw of Solvesso® 100
0.01 pbw of dibutyl tin dilaurate.

A metal panel provided with a cataphoretic primer and a 35 µm thick hydroprimer surfacer layer applied thereto and baked was spray-coated with a black waterborne base coat in a dry layer thickness of 15 µm, flashed off for 5 minutes at 70° C. and then spray-coated with the clear coat in a vertical position in a wedge shape with a layer thickness gradient from 10 µm to 70 µm dry layer thickness, and after 10 minutes flashing off at room temperature, baking was carried out for 30 minutes at 140° C. (object temperature). The clear coat sag limit was visually determined.

A metal panel provided with a cataphoretic primer and a 35 µm thick hydroprimer surfacer layer applied thereto and baked was spray-coated with a black waterborne base coat in a dry layer thickness of 15 µm, flashed off for 5 minutes at 70° C. and then spray-coated with the clear coat in 40 µm dry layer thickness, and after 10 minutes flashing off at room temperature, baking was carried out for 30 minutes at 140° C. (object temperature). Wash scratching resistance was determined by measurement of the residual gloss before and after reflow in % (ratio of initial gloss of the multi-layer coating to its gloss after wash scratching, gloss measurement at an angle of illumination of 20 ° in each case; reflow means a one hour exposure of the scratched panel to an object temperature of 60° C. in a laboratory oven). Scratching was carried out using the laboratory-scale Amtec Kistler car-wash (cf. Th. Klimmasch and Th. Engbert, Development of a uniform laboratory test method for assessing the car-wash scratch resistance of automotive top coats, in DFO Proceedings 32, pages 59 to 66, Technologie-Tage, Proceedings of the seminar on Apr. 29 and 30, 1997 in Cologne, published by Deutsche Forschungsgesellschaft für Oberflächenbehandlung e.V., Adersstraße 94, 40215 Düsseldorf.)

Examples 4a to 4n

Production of Clear Coat Compositions and Outer Clear Coat Layers of Multi-Layer Coatings According to the Invention Solid polyurethanes with blocked isocyanate groups of Examples 1 and 2 were in each case comminuted, ground and sieved by means of grinding and sieving methods conventional for the production of powder coatings and, in this manner, converted into binder powders with an average particle size of 50 µm (determined by means of laser diffraction).

Example 3 was repeated several times wherein part of the t-HDI fully blocked with butanone oxime was replaced by a pulverulent polyurethane with blocked isocyanate groups as described in Examples 1 and 2. The replacement was performed by substituting the pulverulent polyurethane with blocked isocyanate groups for part of the solution of the t-HDI fully blocked with butanone oxime in each case according to a 10 mol-% or in a second series in each case according to a 20 mol-% substitution of blocked NCO. Where necessary, the initial flow time was adjusted to the same value as in Example 3.

Sag limit and wash scratching resistance were determined under the same conditions as in Example 3.

Table 3 shows the measured sag limit in μm and the wash scratching resistance, with reference to Examples 3 and 4a to 4n in each case for a 10 mol-% or a 20 mol-% substitution of blocked NCO. The first stated value in each case here relates to the 10 mol-% and the second value to the 20 mol-% substitution.

TABLE 3

| Examples (polyurethane powder used) | Sag limit (μm) | Residual gloss before reflow (%) | Residual gloss after reflow (%) |
|---|---|---|---|
| 3 (./.) | 29 | 42 | 58 |
| 4a (1a) | 30; 34 | 43; 51 | 63; 68 |
| 4b (1b) | 31; ./. | 50; ./. | 65; ./. |
| 4c (1c) | ./.; 33 | ./.; 48 | ./.; 67 |
| 4d (1d) | 34; 35 | 45; 47 | 66; 71 |
| 4e (1e) | ./.; 30 | ./.; 50 | ./.; 67 |
| 4f (1f) | ./.; 35 | ./.; 49 | ./.; 64 |
| 4g (1g) | ./.; 34 | ./.; 52 | ./.; 69 |
| 4h (1h) | 31; 32 | 48; 51 | 69; 73 |
| 4i (2c) | ./.; 33 | ./.; 61 | ./.; 75 |
| 4k (2e) | 29; 34 | 52; 55 | 67; 73 |
| 4l (2f) | 32; ./. | 55; ./. | 70; ./. |
| 4m (2h) | 29; ./. | 45; ./. | 63; ./. |
| 4n (2i) | ./.; 33 | ./.; 59 | ./.; 73 |

What is claimed is:

1. Non-aqueous, liquid coating compositions which contain organic solvents, at least one polyurethane resin B with blocked isocyanate groups and at least one binder C with functional groups reactive towards the blocked isocyanate groups, wherein the at least one polyurethane resin B is present as particles having a melting temperature of 40 to 160° C., and wherein the at least one polyurethane resin B is a polyurethane with two blocked isocyanate groups per molecule which can be prepared by reacting a diisocyanate component, a diol component and at least one monofunctional blocking agent selected from the group consisting of CH-acidic compounds; aliphatic alcohols; cycloaliphatic alcohols; glycol ethers; phenols; oximes; lactams; azole blocking agents of the imidazole, pyrazole, triazole, or tetrazole type; and a combination thereof, in the molar ratio of diisocyanate:diol:monofunctional blocking agent of x: (x−1):2, wherein x is a variable number and means any value from 2 to 6, wherein 50 to 80 mol % of the diisocyanate component is formed by 1,6-hexane diisocyanate, and 20 to 50 mol % by one or two diisocyanates, each forming at least 10 mol % of the diisocyanate component and being selected from the group consisting of toluylene diisocyanate, diphenylmethane diisocyanate, dicyclohexylmethane diisocyanate, isophorone diisocyanate, trimethylhexane diisocyanate, cyclohexane diisocyanate, cyclohexanedimethylene diisocyanate and tetramethylenexylylene diisocyanate, wherein the mol % of the respective diisocyanates add up to 100 mol %, wherein 20 to 100 mol % of the diol component is formed by at least one linear aliphatic alpha,omega-C2-C12-diol, and 0 to 80 mol % by at least one diol that is different from linear aliphatic alpha,omega-C2-C12-diols, wherein the mol % of the respective diols add up to 100 mol %.

2. The coating compositions of claim 1, further comprising one or more components D comprising components free of functional groups that are reactive towards blocked isocyanate groups, wherein the resin solids content consists of 20 to 70 wt. % of the at least one polyurethane resin B, 30 to 80 wt. % of the at least one binder C and 0 to 30 wt. % of one or more components D, wherein the weight percentages add up to 100 wt. %.

3. The coating compositions of claim 1 further comprising at least one blocked polyisocyanate A which is not solid at room temperature and/or is present in dissolved form, wherein the functional groups of the at least one binder C are also reactive towards the blocked isocyanate groups of A.

4. The coating compositions of claim 3, wherein the resin solids content consists of 20 to 70 wt. % of the blocked isocyanate component consisting of components A and B, 30 to 80 wt. % of the at least one binder C and 0 to 30 wt. % of one or more components D, wherein the weight percentages add up to 100 wt. %.

5. The coating compositions of claim 4, wherein the blocked isocyanate component consists of more than 0 to 90 wt. % of the at least one blocked polyisocyanate A and 10 to less than 100 wt. % of the at least one polyurethane resin B with blocked isocyanate groups, wherein the weight percentages add up to 100 wt. %.

6. The coating compositions of claim 1, wherein the solids content is 40 to 85 wt. %, the organic solvent content is 15 to 60 wt. % and the sum of the wt.-% of the solids content and the organic solvent content is 90 to 100 wt.-% and wherein the solids content consists of the resin solids content and the optional components: pigments, fillers and non-volatile additives.

7. The coating compositions of claim 1, wherein the solubility of the at least one polyurethane resin B is less than 10 g per liter of butyl acetate at 20° C.

8. The coating compositions of claim 1, wherein the average particle size of the polyurethane resin B particles determined by means of laser diffraction is 1 to 100 μm.

9. The coating compositions of claim 1, wherein the polyurethane resin B particles are formed by grinding of the at least one solid polyurethane resin B or by hot dissolution of the at least one polyurethane resin B in a dissolution medium and subsequent polyurethane resin B particle formation during and/or after cooling.

10. Non-aqueous, liquid coating compositions which contain organic solvents, one polyurethane resin B with blocked isocyanate groups as the only blocked isocyanate component and at least one binder C with functional groups reactive towards the blocked isocyanate groups, wherein the one polyurethane resin B is present as particles having a melting temperature of 40 to 160° C., and wherein the one polyurethane resin B is a polyurethane with blocked isocyanate groups which can be prepared by reacting a trimer of a (cyclo) aliphatic diisocyanate, 1,6-hexanediisocyanate, a diol component and at least one monofunctional blocking agent selected from the group consisting of CH-acidic compounds; aliphatic alcohols; cycloaliphatic alcohols; glycol ethers; phenols; oximes; lactams; azole blocking agents of the imidazole, pyrazole, triazole, or tetrazole type; and a combination thereof, in the molar ratio of diisocyanate:1,6-hexanediisocyanate:diol: monofunctional blocking agent of 1:x:x:3, wherein x is a variable number and means any value from 1 to 6, wherein the diol component is one single linear aliphatic alpha,omega C2-C12 diol or a combination of two to four (cyclo)aliphatic diols, wherein in the case of diol combination, each of the diols makes up at least 10 mol % of the diols of the diol combination and the diol combination consists of at least 80 mol % of at least one linear aliphatic alpha,omega C2-C12 diol.

* * * * *